United States Patent
Horton

(10) Patent No.: US 7,670,511 B2
(45) Date of Patent: Mar. 2, 2010

(54) USE OF CATHODIC PROTECTION COMPOUNDS ON TREATED METAL ARTICLES

(75) Inventor: Stephen D. Horton, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 11/576,052

(22) PCT Filed: Sep. 22, 2005

(86) PCT No.: PCT/US2005/033946

§ 371 (c)(1),
(2), (4) Date: Mar. 27, 2007

(87) PCT Pub. No.: WO2006/039179

PCT Pub. Date: Apr. 13, 2006

(65) Prior Publication Data

US 2007/0289879 A1     Dec. 20, 2007

Related U.S. Application Data

(60) Provisional application No. 60/615,278, filed on Oct. 1, 2004.

(51) Int. Cl.
*H01B 1/12* (2006.01)
(52) U.S. Cl. ............... 252/512; 252/513; 252/500; 427/180; 427/299; 427/327; 427/77; 148/245; 148/250
(58) Field of Classification Search ............ 252/512, 252/500, 513; 427/180, 299, 327, 77; 148/245, 148/250
See application file for complete search history.

(56) References Cited

U.S. PATENT DOCUMENTS

| | | | |
|---|---|---|---|
| 3,562,124 A | 2/1971 | Leon et al. | |
| 3,998,779 A | 12/1976 | Baer et al. | |
| 4,132,572 A | 1/1979 | Parant et al. | |
| 4,376,000 A | 3/1983 | Lindert | |
| 5,650,060 A | 7/1997 | Huang et al. | |
| 5,700,398 A | 12/1997 | Angelopoulos et al. | |
| 5,750,249 A | 5/1998 | Walther et al. | |
| 5,968,417 A | 10/1999 | Viswanathan | |
| 6,231,789 B1 * | 5/2001 | Hawkins et al. | 252/512 |
| 6,402,933 B1 | 6/2002 | Dowling | |
| 6,562,201 B2 | 5/2003 | Dowling | |
| 6,627,117 B2 | 9/2003 | Geer et al. | |
| 2005/0161641 A1 | 7/2005 | Gros | |
| 2006/0011893 A1 | 1/2006 | Gros | |
| 2006/0058423 A1 | 3/2006 | Gros et al. | |
| 2007/0111015 A1 | 5/2007 | Avakian et al. | |
| 2007/0114498 A1 | 5/2007 | Geer et al. | |
| 2007/0128351 A1 * | 6/2007 | Nanna et al. | 427/180 |
| 2008/0265217 A1 * | 10/2008 | Horton | 252/503 |

FOREIGN PATENT DOCUMENTS

| | | |
|---|---|---|
| DE | 10247691 | 4/2004 |
| JP | 08-277370 | 10/1996 |
| WO | WO2005078158 | 8/2005 |

* cited by examiner

*Primary Examiner*—Bruce F Bell
(74) *Attorney, Agent, or Firm*—John H. Hornickel

(57) ABSTRACT

A cathodic protection coating is disclosed that unexpectedly protects a treated metal substrate, notwithstanding the presence of a phosphate-containing conversion coating between the metal substrate and the cathodic protection compound. The cathodic protection coating includes sacrificial metallic particles less noble than metal in the metal substrate to be protected. The coating also includes inherently conductive polymer.

12 Claims, 2 Drawing Sheets

Fig. 1
(Prior Art)
Fig. 2
(Prior Art)
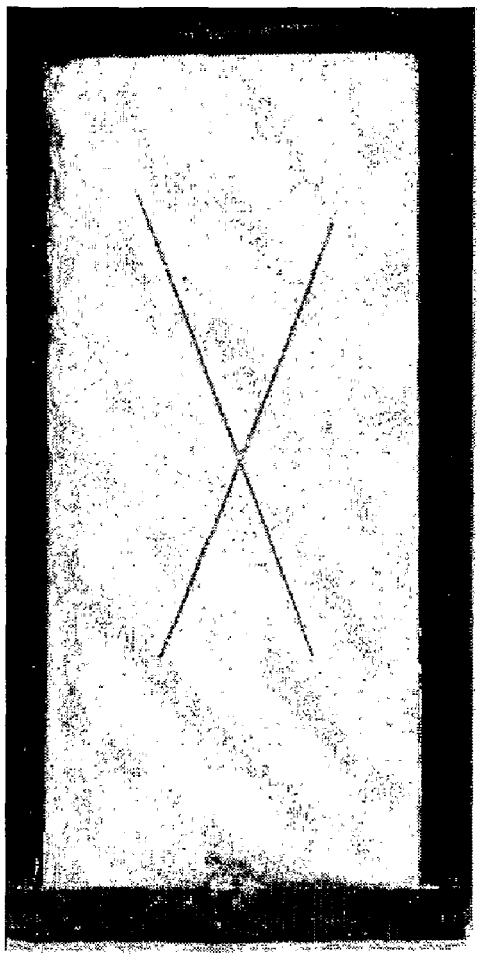
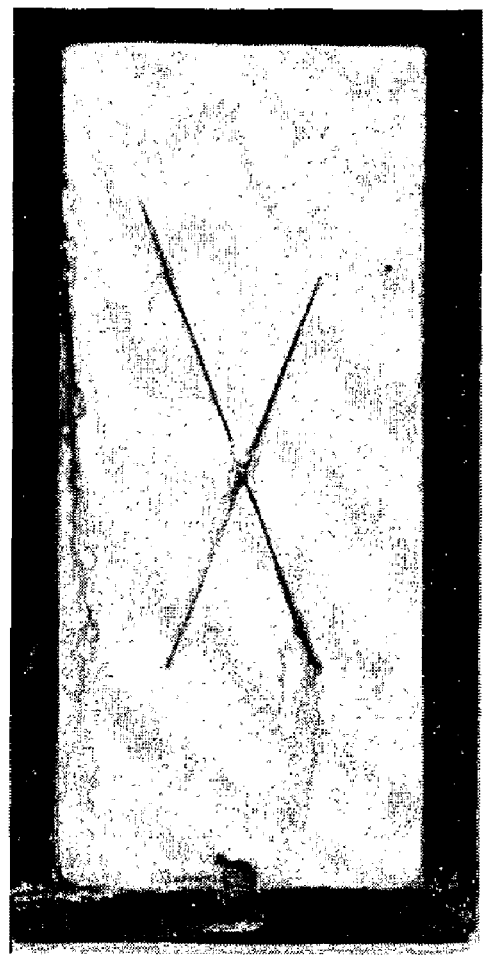

Fig. 3
(Prior Art)
Fig. 4
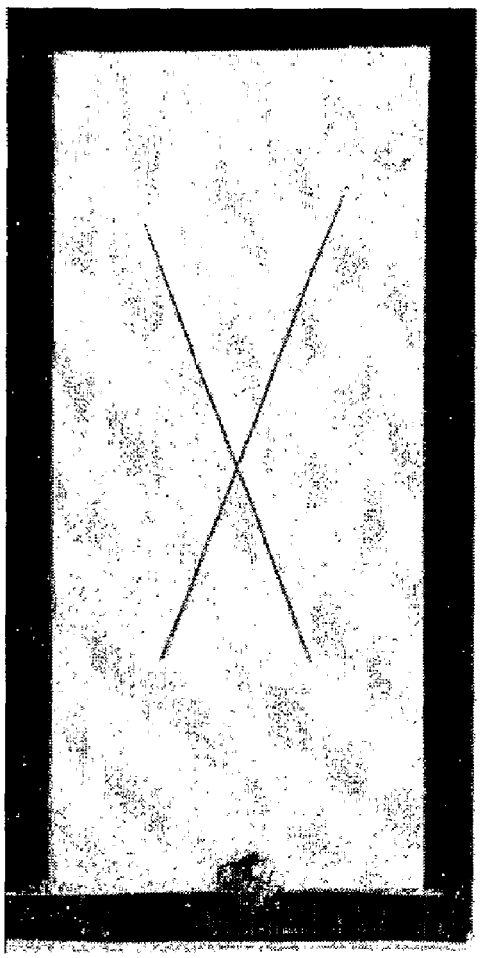
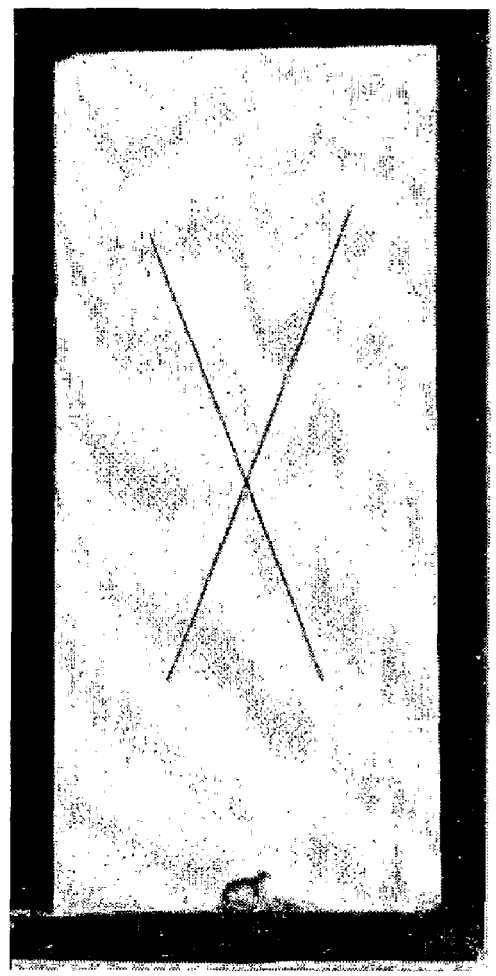

USE OF CATHODIC PROTECTION COMPOUNDS ON TREATED METAL ARTICLES

CLAIM OF PRIORITY

This application claims priority from U.S. Provisional Patent Application Ser. No. 60/615,278 bearing and filed on Oct. 1, 2004.

FIELD OF THE INVENTION

This invention relates to cathodic protection compounds used to protect treated metal articles.

BACKGROUND OF THE INVENTION

In modern society, over the past fifty years, there has been a shift from metals to polymers, partly because the latter do not oxidize in the environment. For example, corrosion of metal destroys valuable property. Corrosion is the inevitable reaction of metal to form metal oxide when the metal is exposed to environmental conditions that permit such corrosion. Billions of dollars are spent each year to repair or replace metallic structures because of such corrosion.

The corrosion of iron-containing articles, the natural process normally called "rusting", has prompted considerable effort to find effective, economical ways to prevent or reduce rust. Coating the surface of the iron-containing article, the process of painting, was first attempted to shield the article from the elements needed for the natural rusting reaction to begin.

Iron-containing articles form the structures that have erected the cities and commercial links between them. Ironwork, for such diverse uses as multi-story buildings, suspension bridges, tunnels beneath a mountain or a river, high tension utility powerlines, fuel storage tanks, the Statue of Liberty, the Eiffel Tower, and reinforcement grids for concrete structures of all types, all require such protection from corrosion.

Conventionally, many types of metals are subjected to treatment as a part of manufacturing process. "Treatment" means the treatment of a metal surface which is not bare metal, and preferably has been previously treated with a conventional conversion coating process. Such conversion coatings are well known and have been described, for example, in Metal Handbook, Volume II, 8th Edition, pp. 529-547 of the American Society for Metals and in Metal Finishing Guidebook and Directory, pp. 590-603 (1972). U.S. Pat. No. 4,376,000 (Lindert) describes the process of conversion coating as 1. Cleaning;
2. Water rinsing;
3. Formation of the conversion coating by contact with a suitable phosphate, chromate, or similar conventional bath;
4. Water rinsing;
5. Applying a treatment solution; and
6. Optionally, drying the surface.

Suitable conversion coatings include, without limitation, iron phosphate, manganese phosphate, zinc phosphate, zinc phosphate modified with calcium, nickel, or manganese ions. For environmental reasons, chromate coatings are less preferred.

Examples of suitable metal surfaces for treatment with conversion coatings include zinc, iron, aluminum and cold-rolled, polished, pickled, and hot-rolled steel and galvanized steel surfaces.

Conventionally, modern steel treatment includes a coating at the time of manufacturing of a phosphate-containing material to form an iron phosphate coating on the surface of the steel. The treatment is often an integral process of steel manufacturing. An example of the art of steel treatment with phosphate materials is U.S. Pat. No. 4,132,572 (Parant et al.) which discloses steel, aluminum and aluminum alloys, zinc and zinc alloys treated to improve corrosion resistance with an aqueous solution of a fluorophosphate salt to passivate the metal surface, before or after phosphatizing and prior to painting. Other examples of commonly practiced zinc phosphate and iron phosphate coating processes and compositions can be found in U.S. Pat. Nos. 3,333,988; 3,297,494; 3,425,876; 3,520,737; 3,101,286; 2,987,428 and 3,129,123.

Other anti-corrosion mechanisms have taken advantage of the Galvanic Series, whereby a less noble metal is a sacrificed in the environment where the iron would otherwise rust. This "cathodic protection" of metal has spawned an enormous industry dedicated to preserving metallic property against the ravages of the environment.

Cathodic protection utilizes the physics of a galvanic circuit, which can be assisted by power to be an active circuit to drive the corroding effects away from the metal being protected or which can be passive without power. Examples of passive galvanic circuitry are disclosed in U.S. Pat. No. 5,650,060 (Huang et al.) for an electrode-based system and in U.S. Pat. No. 5,976,419 (Hawkins et al.) for a coating-based system. Both types of systems rely on a more anodic metal in the Galvanic Series, such as zinc, to protect the more valuable iron in the structure. In the Huang et al. electrode, the zinc is in the form of plate adhered by an ionically conductive adhesive to a structure. In the Hawkins et al. coating, the zinc is in the form of particles dispersed in the binder and inherently conductive polymer. In both cases, the zinc is the anode of the galvanic circuit. The anodic zinc is sacrificed to preserve the cathodic iron.

The combination of inherently conductive polymer with sacrificial metal particles becomes a cathodic protection coating to protect metal substrates in which the metal particles are less noble than the metal of the substrate. Such cathodic protection coating is disclosed in U.S. Pat. No. 6,627,117 (Geer et al.), the disclosure of which is incorporated by reference herein. Such cathodic protection coating is marketed by PolyOne Corporation under the brand Catize® coating.

It has been thought previously that the cathodic protection coatings, such as taught by Hawkin et al. and Geer et al. were required to be applied directly to the surface of untreated steel. This belief caused concern by the users of cathodic protection coatings, because such coatings were often desired to be applied to specific metallic articles, well after the time that such metal was manufactured at the steel plant. Either the cathodic protection coating needed to be applied at the steel plant in substitution for the phosphate treatment or the steel was transported to a customer without the phosphate treatment. The former opportunity disrupts a well-organized steel manufacturing process; the latter exposes the steel to rusting conditions during its time in transit and inventory. Neither arrangement has been satisfactory to users of steel and other metals susceptible to corrosion.

SUMMARY OF THE INVENTION

What the art needs is a cathodic protection compound that can be used in association with phosphate treated steel and other similarly protected metals.

Unexpectedly, and departing from conventional wisdom and technique, it has been found that cathodic protection coatings as taught by Hawkin et al. and Geer et al. can be used effectively even over phosphate treatment conversion coatings such as those taught by the patent and technical references listed above.

In other words, cathodic protection coatings can form a galvanic circuit with steel and other metals treated with a phosphate-containing conversion coating notwithstanding the presence of that coating. The zinc or aluminum metal particles in the cathodic protection coating are sacrificed even those such particles are not in a coating contiguous to the metal those particles are chosen to protect.

One aspect of the present invention is a method of using a cathodic protection compound to protect a metal substrate, comprising the step of applying a coating of the cathodic protection compound to a surface of a metal substrate that has been treated with a phosphate-containing conversion coating, wherein the cathodic protection coating comprises (a) an electrically effective amount of inherently conductive polymer; (b) an electrically effective amount of metal particles wherein the metal is less noble than metal of the metal substrate; and (c) binder.

"Electrically effective amount" means the minimum concentration of inherently conductive polymer and metal particles to maintain sufficient electrically conductivity to maintain a galvanic circuit useful for cathodic protection in which the metal in the metallic substrate is the cathode and the metal particles in the coating are the sacrificial anodes.

The binder, and hence the compound, is desirably in the form of a flowable material. "Flowable material" can be (a) a film-forming liquid, such as a paint or other coating, to be sprayed or brushed on to a metal-containing article needing cathodic protection;

(b) an amorphous solid, such as a polymeric adhesive or other polymer, to be formed as a layer on the metal-containing article;

(c) a powder to be applied to form a coating on the metal-containing article; or (d) a vapor, such as a superheated gas that coalesces on the metal-containing article.

Preferably, the flowable material is a polymeric binder capable of rapidly and inexpensively forming a film or other coating on the metal-containing article to be cathodically protected. The flowable material need not itself be electrically conductive if the selection of flowable material is made less expensive as a result.

More preferably, the flowable material is capable of forming a barrier in the same manner as any paint or other coating does to provide a physical aspect of protection of the metal-containing article to be cathodically protected.

Another aspect of the present invention is a metal substrate protected cathodically by a cathodic protection compound of the present invention.

An advantage of the present invention is that steel and other mass-produced metals susceptible to corrosion during inventory storage can be manufactured in the same conventional manner, but that certain articles made from them can nonetheless be protected by a cathodic protection coating that passively and galvanically protects the metal through the treatment coating of phosphate-containing material.

These and other unexpected advantages of the invention are discussed in greater detail below, in conjunction with the images described below.

BRIEF DESCRIPTION OF THE DRAWINGS

FIG. 1 a digital image of a sample of Comparative Example A.

FIG. 2 a digital image of a sample of Comparative Example B.

FIG. 3 a digital image of a sample of Comparative Example C.

FIG. 4 a digital image of a sample of Example 1.

EMBODIMENTS OF THE INVENTION

Metal Particles

If the metal particles are to protect some other metal which is in electrical communication with the cathodic protection film or coating, then the metal chosen to be generated needs to be more anodic (less noble) than the metal to be protected, according to the Galvanic Series. Such concept is disclosed in U.S. Pat. No. 5,976,419 (Hawkins et al.), incorporated by reference herein.

Average particle size can range from about 0.2 μm to about 25 μm, and preferably from about 2 to about 10 μm, and most preferably about 2 μm.

Metal particle shape is also a parameter. Particle shapes can range from spheres to platelets. Generally, the larger surface area per unit volume is preferable. However, one skilled in the art must also take into consideration the difficulties of processing high aspect ratio platelets compared with low aspect ratio spheres.

While not preferred, particles of metal can aggregate or agglomerate within the polymer, without departing from the scope of the present invention.

The sacrificial anodic metal particles reside in the flowable material, preferably intimately intermixed in, or co-continuous with, a flowable material that can be easily made contiguous to a treatment conversion coating under which is the cathodic metal to be protected.

The selection of the sacrificial anode is determined by the cathodic metal to be protected and then influenced by cost, availability, ease of handling, environmental impact, and other factors. The determination of metal candidates is founded in the Galvanic Series, which establishes the continuum of metallic performance. So long as the anode metal is higher or more anodic within the Galvanic Series than the cathodic metal, then it is a candidate.

The Galvanic Series is well-known to electro-chemists and can be employed without undue experimentation to select a suitable candidate for sacrificial anodic use. One location to examine the choices of candidates is www.corrosionsource.com. Another location based on Military Specifications is www.eaa1000.av.org/technicl/corrosion/galvanic.htm which identifies alloys of metals as well as pure metals in the Corrosion Control—Galvanic Table.

Non-limiting examples of common sacrificial anodes relative to cathodic metals to be protected are seen in Table 1.

TABLE 1

| Cathodic Metal to be Protected | Sacrificial Anodic Metal |
| --- | --- |
| Iron | Zinc, Aluminum, Tin |
| Copper | Iron + Those to Protect Iron |
| Nickel | Copper + Those to Protect Copper |
| Titanium | Nickel + Those to Protect Nickel |
| Silver | Titanium + Those to Protect Titanium |

Of the various possible metals, transition metals are preferred because such metals have low ionization energies, positive oxidation states, high melting points, high boiling points, high electrical conductivity, malleability, and other desirable properties.

The amount of anodic metal within the compound can range from about 0.1% to about 95%, and preferably from about 0.2% to about 40%. All percents are weight percents to the total solids of the total compound. The amount of anodic metal to be included should exceed the anticipated duration of galvanic protection, taking into account the rate of consumption of the metal as the sacrificial anode. It is possible for one skilled in the art to make computations to determine a preferred amount of anodic metal loading into the flowable material.

Metal particles can be any element less noble than the metal to be protected. Preferably, the metal particles are zinc because of lower cost than other metals and because zinc is less noble than iron, the metal most often protected by cathodic protection systems. Alternatively, one can use aluminum in circumstances where there is concern about the use of zinc in the environment. As the Military Specification Galvanic Table indicates, there are many suitable alloys of aluminum and another metal suitable for corrosion control.

Zinc particles are commercially available from such sources as Purity Zinc Metals LLC of Clarksville, Tenn.; Humel Croton, Inc.; and Trident Alloys, Ltd. Aluminum particles are commercially available from Eckart, Inc.

Flowable Material

The flowable material can be electrically active or inactive. An electrically inactive flowable material is more cost effective with at least an electrically effective amount of inherently conductive polymer according to the present invention. However, it may be desirable in some embodiments to assist the conductive media by having the flowable material to also be electrically active to improve electron transfer in the galvanic circuit in which the metal substrate to be protected is the cathode and the metal particles intermixed with the conductive media in the flowable material are the sacrificial anodes.

Non-limiting examples of electrically inactive flowable materials are any polymer capable of forming a film or coating or a molded or extruded product, such as polymers from olefins, acrylics, epoxies, urethanes, alkyds, uv-curable or electron-beam curable acrylates, polyvinyl chloride, polyester, polyvinyl alcohol, ethylene vinyl acetate, ionomers of ethylene acrylic acid, fluoropolymers, polymers of silicone, phenolic resins, melamine, polyamide, natural and synthetic rubbers, styrenic block copolymers, polyacrylamide, polyvinyloxazoline, and polyethylenimine.

"Polymers" means naturally-occurring polymers, synthetically-produced polymers, combinations of naturally-occurring polymers and synthetically-produced polymers by physical or chemical interaction, or combinations thereof.

All principal forms of polymer physics are acceptable for use in the present invention: thermoplastic plastics, thermoplastic elastomers, thermoset plastics, thermoset elastomers, and the mixtures of them within such four corners of polymer physics. Thermoplastics are preferred for ease of formulation and application, but thermoset plastics are preferred for performance results. A non-limiting list of acceptable polymer chemistries can be found at www.PolyOne.com.

The polymer can be adhesive or non-adhesive. Its adhesive can be naturally occurring or generated by plasticizing and tackifying agents. A non-limiting list of acceptable adhesives can be found at www.3M.com.

Commercially available thermoplastic and thermoset polymers include commercial paints and other film-forming compounds, including without limitation, Valspar® brand paints and coating from Valspar of Minneapolis, Minn. USA; products of Sherwin-Williams of Cleveland, Ohio USA, and Rustoleum® brand paints and coatings from RPM Industries of Medina, Ohio USA.

Electrically active flowable materials are also suitable in the present invention by including as an optional ingredient electrically active, galvanically inactive materials such as carbon fibers, particles, and nanotubes in an amount effective to enhance electrically conductivity while not interfering with the galvanic circuit used to cathodically protect the metal substrate.

The optional carbon fibers, particles, or nanotubes can be present in an amount of from 0 to about 10 weight percent of total solids of the flowable material.

Of possible candidates, carbon fibers and nanotubes are preferred because of their large aspect ratios in spite of their short lengths. For example, carbon fibers easily can have aspect ratios greater than 10:1 (L/W) and nanotubes can achieve such aspect ratios in spite of being an order of magnitude or more smaller in diameter than the carbon fibers.

If nanotubes are selected for use, single wall nanotubes are preferred to multiple-walled nanotubes.

Single-walled carbon nanotubes is an emerging technology that is preferred, such as those disclosed in U.S. Patent Publication 20030075682 (Colbert et al.), the disclosure of which is incorporated herein by reference.

Commercially available sources of carbon fibers and nanotubes currently include the Panex® carbon fiber product line of Zoltek Corporation of St. Louis, Mo., the Pyrograf-I™ multi-walled carbon nanotube product line of Nano Graphite Materials, Inc. of Cedarville, Ohio and the Buckytube single-walled carbon nanotube product line of Carbon Nanotechnologies, Inc. of Houston, Tex.

Inherently Conductive Polymers

Inherently conductive polymers suitable for the invention include polymers having repeating monomeric units of aniline, thiophene, pyrrole, phenyl mercaptan, and the like. Other examples include a conducting polymer selected from the group consisting of substituted and unsubstituted polyparaphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes, mixtures thereof, and copolymers thereof. These conductive polymers are disclosed in a variety of patents, including U.S. Pat. No. 5,069,820 (Jen et al.); U.S. Pat. No. 5,160,457 (Elsenbaumer); U.S. Pat. No. 5,185,100 (Han et al.); U.S. Pat. No. 5,281,363 (Shacklette et al.); U.S. Pat. No. 5,378,403 (Shacklette); U.S. Pat. No. 5,422,423 (Shacklette et al.); U.S. Pat. No. 5,456,862 (Kwan-Yue et al.); U.S. Pat. No. 5,567,355 (Wessling et al.); U.S. Pat. No. 5,700,398 (Angelopoulos et al.) and U.S. Pat. No. 5,911,918 (Shacklette et al.). As described in these patents, the inherently conductive polymer is often doped with an acid such as hydrochloric acid or p-toluene sulfonic acid.

Preferred is a substituted polyaniline such as disclosed in U.S. Pat. No. 5,968,417 (Visawanathan) and more particularly that marketed by PolyOne Corporation as Teslart™ inherently conductive polymers. This substituted polyaniline is lignosulfonic acid-grafted polyaniline.

While it is less likely that one skilled in the art would desire to use more than one inherently conductive polymer due to cost considerations, it is possible to mix polyaniline-grafted-lignosulfonic acid with another inherently conductive polymer listed above.

Process

The preparation of compounds of the present invention is uncomplicated, particularly when the preparation is satisfied by a mixing of coatable materials. Mixing in an attritor is sufficient to thoroughly mix a pre-blend of inherently conductive polymer and metallic particles, followed by mixing of that pre-blend into a carrier/binder, conventionally a paint, using a paint mixer. The mixing speeds range from 600 to 1000 rpm and temperature of mixing can be ambient.

Usefulness of the Invention

Cathodic protection compounds of the present invention can protect metal substrates such as iron, aluminum and other metal substrates where the metal of the substrate is more noble than the metallic particles of the coating.

The selection of the coating binder/carrier as the flowable material to make coatings of the present invention should be done considering good adhesion of the coating to the metal substrate. Some examples of the coating systems that have been successfully used in conjunction with inherently conductive polymer and metallic parties are acrylic, urethane, epoxy and alkyd. Also, water-based, solvent-based as well as 100% solids coatings can provide cathodic protection to metal substrates.

Additional features of the invention are found in the following Examples.

EXAMPLES

Table 2 shows the ingredients used in the coatings and their commercial sources. Table 3 has two sections: Assembly of Comparative Examples A-C and Example 1 and Resulting Properties when tested according to ASTM Test B117.

The salt spray data results, derived according to the ASTM test by visual inspection, are reinforced by the digital images of the coated metal substrates which were the subject of the visual comparison on the unscored (field) surface and at the scored region of each coated metal substrate.

FIGS. 1-4 demonstrate the considerable and unexpected utility of the present invention, associated with Comparative Examples A-C and Example 1, respectively.

The mixtures of coatings for Comparative Examples A-C and Example 1 were prepared using a paint mixer at ambient conditions. All test panels were sprayed with a commercial paint sprayer, under ambient conditions, first with the primer and then with the top coat.

TABLE 2

Source of Ingredients

| Ingredient Name | Purpose | Brand Name | Commercial Source |
| --- | --- | --- | --- |
| Inorganic Zinc Rich Primer | Primer with sacrificial metal | Zinc Clad ® II HS B69VZ3 Base B69VZ1 Hardener B69D11 Zinc Dust | Sherwin-Williams Cleveland, Ohio |
| Two Component High Solids Epoxy Coating | Protective top coat | DTM Epoxy Mastic 9144402 DTM Epoxy 9101402 Std Activator | RPM Industries Medina, Ohio |
| Anti-Corrosion Paint Additive | Sacrificial metal and inherently conductive polymer | Catize ® DLPZ-1 | PolyOne Corporation Avon Lake, Ohio |
| Untreated Steel Test Panel | Test substrate | Q-Panel ® | Q-Panel Lab Products Cleveland, Ohio |
| Iron Phosphate Treated Steel Panel | Test substrate | Q-Panel ® Bonderite 1000 | Q-Panel Lab Products |

TABLE 3

Test Panels and Results

|  | Comparative Example A | Comparative Example B | Comparative Example C | Example 1 |
| --- | --- | --- | --- | --- |
| *Assembly of Test Panels* | | | | |
| Substrate | Untreated Steel | Untreated Steel | Treated Steel | Treated Steel |
| Primer | B69VZ3 Base 24.4% B69VZ1 Hardener 0.7% Zn Dust (74.9% total solids) | B69VZ3 Base 59.0% B69VA1 Hardener 1.0% DLPZ-1 (40.0% total solids) | B69VZ3 Base 24.4% B69VZ1 Hardener 0.7% Zn Dust (74.9% total solids) | B69VZ3 Base 59.0% B69VA1 Hardener 1.0% DLPZ-1 (40.0% total solids) |
| Top Coat | Base 50%; Hardener 50% | Base 50%; Hardener 50% | Base 50%; Hardener 50% | Base 50%; Hardener 50% |
| *Test Results* | | | | |
| ASTM B117 | Salt Fog, 2850 Hours | Salt Fog, 2850 Hours | Salt Fog, 2850 Hours | Salt Fog, 2850 Hours |
| Example Fig. | FIG. 1 | FIG. 2 | FIG. 3 | FIG. 4 |

TABLE 3-continued

| | Test Panels and Results | | | |
|---|---|---|---|---|
| | Comparative Example A | Comparative Example B | Comparative Example C | Example 1 |
| Field Corrosion Rating 1-10 (10 = least corrosion) | 4 | 8 | 2 | 9.5 |
| Scribe Corrosion Rating 1-10 (10 = least corrosion) | 9.5 | 8.5 | 9.5 | 9.5 |

Example 1 outperforms any of Comparative Examples A-C, when considering the combination of the field corrosion rating and the scribe corrosion rating. 2850 hours computes to 188 days, almost 4 months of continuous exposure to the salt fog.

Example 1 shows unexpectedly better performance than Comparative Example B, even though the phosphate treatment layer resides between the cathodic protection layer and the metal substrate to be protected.

Example 1 shows dramatically better performance than Comparative Example C, especially in the field corrosion rating indicating that general corrosion protection using only zinc metal may protect at a location of barrier interruption (scribed surface) but not the unharmed surface. Thus, the extent of corrosion is more insidious to detect when inspecting metallic substrates.

Comparative Example C performs worse than Comparative Example A in field corrosion rating, perhaps showing that the phosphate treated steel in combination with zinc dust alone is less effective than zinc dust in a contiguous layer to the metal substrate.

Finally, the use of an electrically effective amount of inherently conductive polymer boosts performance of a far smaller quantity of zinc metal particles because the galvanic circuit employs the inherently conductive polymer not present in the conventional highly-loaded zinc primer. The weight of the coating of the present invention is also significantly reduced.

The invention is not limited to the above embodiments. The claims follow.

What is claimed is:

1. A method of using a cathodic protection compound to protect a metal substrate, comprising the step of applying a coating of the cathodic protection compound to a surface of a metal substrate that has been treated with a phosphate-containing conversion coating,
wherein the cathodic protection coating comprises (a) an electrically effective amount of inherently conductive polymer; (b) an electrically effective amount of metal particles wherein the metal is less noble than metal of the metal substrate; and (c) binder.

2. A treated metal substrate comprising:
(a) metal,
(b) phosphate-containing conversion coating on the metal, and
(c) cathodic protection coating on the phosphate-containing conversion coating, wherein the cathodic protection coating comprises (a) an electrically effective amount of inherently conductive polymer; (b) an electrically effective amount of metal particles wherein the metal is less noble than metal of the metal substrate; and (c) binder.

3. The substrate of claim 2, wherein the binder comprises a flowable material comprising a film-forming liquid, an amorphous solid, a powder, or a vapor.

4. The substrate of claim 2, wherein the metal particles have an average particle size ranging from about 0.2 to about 25 μm and have a particle shape ranging from spheres to platelets.

5. The substrate of claim 2, wherein the substrate comprises iron and the metal particles are selected from the group consisting of zinc, aluminum, tin, and combinations thereof.

6. The substrate of claim 3, wherein the flowable material is electrically inactive and a polymer made from one or more of olefins, acrylics, epoxies, urethanes, alkyds, uv-curable or electron-beam curable acrylates, polyvinyl chloride, polyester, polyvinyl alcohol, ethylene vinyl acetate, ionomers of ethylene acrylic acid, fluoropolymers, polymers of silicone, phenolic resins, melamine, polyamide, natural and synthetic rubbers, styrenic block copolymers, polyacrylamide, polyvinyloxazoline, and polyethylenimine.

7. The substrate of claim 6, wherein the polymer is adhesive.

8. The substrate of claim 3, wherein the flowable material is electrically active and includes carbon fibers, carbon particles, carbon nanotubes, and combinations thereof.

9. The substrate of claim 3, wherein the flowable material is electrically active and includes an inherently conductive polymer.

10. The substrate of claim 9, wherein the inherently conductive polymer comprises polymers having repeating monomeric units of aniline, thiophene, pyrrole, phenyl mercaptan, and combinations thereof.

11. The substrate of claim 9, wherein the inherently conductive polymer is selected from the group consisting of substituted and unsubstituted polyparaphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes, mixtures thereof, and copolymers thereof.

12. The substrate of claim 9, wherein the inherently conductive polymer is substituted or unsubstituted polyaniline.

* * * * *